United States Patent [19]

Liepe et al.

[11] Patent Number: 4,528,591
[45] Date of Patent: Jul. 9, 1985

[54] RASTER SCAN FRAME DIGITIZER METHOD AND APPARATUS

[75] Inventors: Steven F. Liepe, Tualatin; Pierre Radochonski, Lake Oswego; Glenn R. Johnson, Aloha, all of Oreg.

[73] Assignee: Tektronix, Inc., Beaverton, Oreg.

[21] Appl. No.: 408,349

[22] Filed: Aug. 16, 1982

[51] Int. Cl.³ .............................................. H04N 5/14
[52] U.S. Cl. .................................... 358/160; 358/282; 340/347 AD; 340/347 SH; 307/360; 307/361; 328/151
[58] Field of Search ............... 358/105, 126, 160, 166, 358/111, 282; 328/151; 340/347 AD, 347 SH; 307/360, 361

[56] References Cited

U.S. PATENT DOCUMENTS

| | | | |
|---|---|---|---|
| 3,877,025 | 4/1975 | Maio | 340/347 AD |
| 4,183,016 | 1/1980 | Sawagata | 340/347 AD |
| 4,194,185 | 3/1980 | Wilson | 340/347 AD |
| 4,242,707 | 12/1980 | Budai | 358/160 |

Primary Examiner—John C. Martin
Assistant Examiner—Michael D. Parker
Attorney, Agent, or Firm—John H. Bouchard; Robert S. Hulse; Francis I. Gray

[57] ABSTRACT

A scheme for digitizing a stationary video image is disclosed. The amplitude of a video signal, representing said video image, is sampled at a plurality of points along the time axis and is compared with the count in a counter. If the amplitude equals the count at a particular point on the time axis, the count is stored in a memory in a location corresponding to said particular point. The process is repeated until a count in the counter is stored in said memory in locations corresponding to all of said plurality of points along the time axis of said video signal. If two or more counters are used, each counting from a different initial value, and if two or more corresponding comparators are used to make the above comparison, the time required to digitize said stationary video image may be reduced. Consequently, the time required for the video image to remain stationary is reduced.

6 Claims, 13 Drawing Figures $$\Delta V = \frac{\text{FULL SCALE VOLTAGE}}{2^N}$$

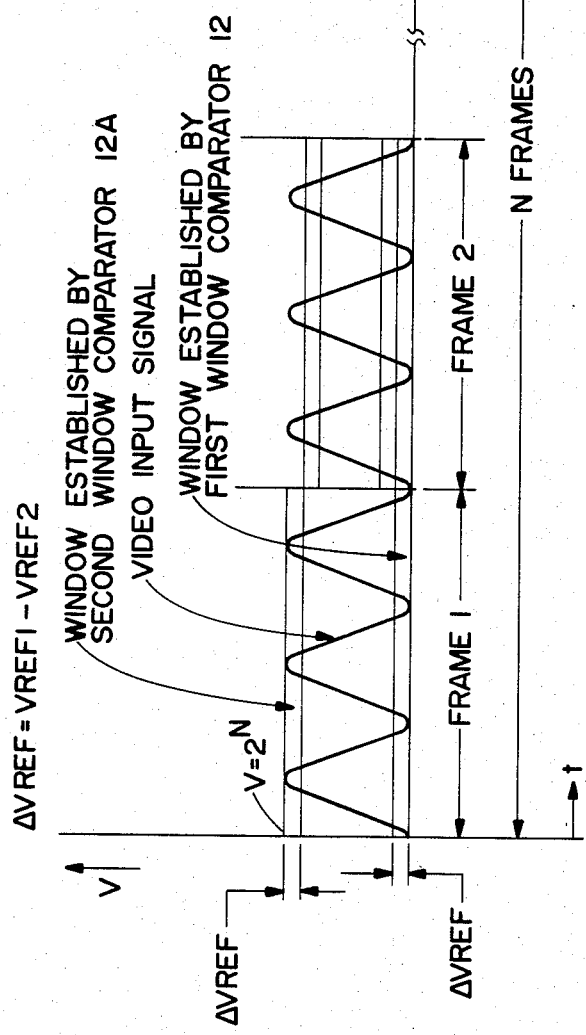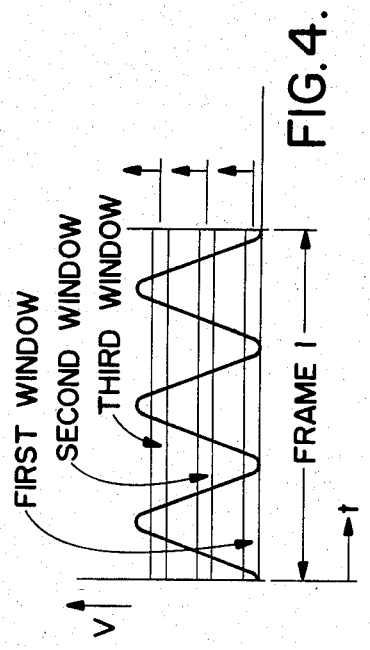
FIG. 3.
FIG. 4.

RASTER SCAN FRAME DIGITIZER METHOD AND APPARATUS

BACKGROUND OF THE INVENTION

The subject matter of the present invention pertains to a raster scan frame digitizer capable of digitizing an image displayed on a cathode ray tube (CRT) and storing the digital values representative of said image in a memory.

When an image is displayed on a cathode-ray tube (CRT), for example, it may be necessary to produce photocopies of the displayed image. Furthermore, it may be necessary to enhance the image, or format the image somewhat differently on the photocopy than that which is displayed on the CRT. Consequently, one method of accomplishing this objective, is to digitize the image, and to store the digital values representative of the image in a memory, so that either the image or the enhanced, reformatted version thereof may be re-created on hardcopies from the digital values.

During the digitization of the image, the image presented on the CRT must remain stationary. However, if the image is continually moving or otherwise changing, it is desirable to decrease the time required to digitize the stationary image displayed on the CRT and thereby decrease the time required for the CRT image to remain stationary. The stationary image may be digitized to accomplish several objectives. It may be necessary to process the image, digitally, in real time. It may also be necessary to produce hard copies of the stationary image, or it may be necessary merely to store the image in a memory for the purpose of formatting the image differently.

In order to process the image, digitally, in real time, it is necessary to digitize the image more rapidly than would be necessary if hard copies of the image were being made or if the image was being stored in the memory In order to digitize the image more rapidly, a more costly system digitizer is needed. However, with this more costly system digitizer, an improvement in image resolution inherently results in a limitation in the system bandwidth. If one needed merely to produce hard copies of the image, or to store the digitized image in the memory, it is not necessary to digitize the image more rapidly. As a result, it is not necessary to use such a costly system digitizer. Therefore, a further system digitizer is needed which will digitize the stationary image less rapidly, relative to the aforementioned more costly system digitizer, and, as a result, will be less costly, will produce a hard copy reproduction of the image having a better resolution and will have associated therewith a better bandwidth relative to the aforementioned more costly system digitizer of the prior art.

SUMMARY OF THE INVENTION

It is therefore a primary object of the present invention to provide a less costly apparatus and method for digitizing a stationary image displayed on a cathode ray tube (CRT), the digital values associated with the digitized image being stored in a memory.

It is another object of the present invention to increase the speed, and thereby decrease the time required to digitize the image displayed on the CRT while simultaneously maintaining a less costly, minimally complex apparatus for accomplishing this objective.

It is another object of the present invention to decrease the time required for the image displayed on the CRT to remain stationary.

These and other objects of the present invention will be accomplished by comparing the amplitude of an incoming video signal at a plurality of points along the time axis with a fixed value. If the fixed value approximately equals the amplitude of the video signal, at a particular point along the time axis, the fixed value is stored in a memory. The fixed value is incremented, and the comparison is made again. When a fixed value has been stored in the memory representative of the amplitude of the video signal associated with each of the plurality of points along the time axis, further storage in memory is terminated. Digitization of the image is then complete.

In one embodiment of invention, a window comparator is used to compare the amplitude of the incoming video with the fixed value. The fixed value may, for example, be a count stored in a counter, the counter being incremented by one each time one scan of the CRT image is completed. The window comparator establishes a certain window, the differential voltage level of the window being a function of the count of the counter. If the amplitude of the video signal falls within the differential voltage level of the window, an output is generated from the window comparator. A D-type flip-flop is connected to the output of the window comparator. A sample clock pulse energizes the D-type flip-flop once each time a pixel on a line of the CRT is encountered during the frame scan. In response to the sample clock pulse, the D-type flip-flop generates an output pulse corresponding to the output signal from the window comparator. The output pulse enables a RAM memory, so that a fixed value may be written therein. As the counter is increased in its count, the d.c. level of the window rises from zero, the original fixed value (count) in the counter. Eventually, as the level of the window rises, all of the incoming video will be encountered within the differential voltage level of the window. Each time a portion of the incoming video is encountered within the differential voltage level of the window, the output pulse enables the RAM memory and a fixed value, a count in the counter, is written in the RAM memory.

If it is desired to increase the speed at which the display image is digitized, two or more comparisons are made between the amplitude of the video signal and a respective fixed value. In said one embodiment, two or more window comparators are utilized along with two or more respective D-type flip-flops, two or more respective counters and D/A converters. The outputs of each of the window comparators are connected to input terminals of D-type flip-flops. The output terminals of each of the D-type flip-flops are connected to input terminals of an OR-gate. The output of the OR-gate is used to enable a RAM memory. When the RAM memory is enabled by an output from one of the D-type flip-flops, the count of the corresponding counter is stored in the RAM memory, the count being a fixed value representative of the amplitude of the video signal at a particular point on the CRT. By using two or more counters and two or more window comparators, two or more windows are developed to digitize the video signal. Therefore, the speed at which the video signal is digitized is increased, and the time required for the CRT image to remain stationary is decreased.

Further scope of applicability of the present invention will become apparent from the description given hereinafter. However, it should be understood that the details of the description and the specific examples while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A full understanding of the present invention will be obtained from the detailed description given hereinbelow and the accompanying drawings which are given by way of illustration only, and thus are not limitative of the present invention, and wherein:

FIG. 3 illustrates a video input signal waveform and two windows for each frame for providing a functional explanation of the operation of the embodiment of invention shown in FIG. 2.

FIG. 4 illustrates a video input signal waveform and three windows for each frame for providing a functional explanation of the operation of an alternative embodiment of invention.

DETAILED DESCRIPTION OF THE INVENTION

As mentioned hereinbefore, this invention is directed to an apparatus and method for digitizing a stationary image on a CRT by dividing each horizontal line of an image displayed on the CRT into "N" pixels, the video signal, if any, present at each pixel being assigned a digital value and stored in a memory. All of the horizontal lines of the CRT image collectively comprise a frame. When the CRT image for the entire frame is digitized, and stored in memory, the digital values stored in memory can be used to enhance or re-format the image in any manner desirable for further recreation of the image on hardcopy. However, the image displayed on the CRT must remain stationary during the digitization thereof. Since some images, displayed on a CRT, are inherently moving, and/or changing, the time required to digitize the image is an important consideration. The present invention is directed to minimizing the time required to digitize the image, and thereby, to minimizing the time required for the CRT image to remain stationary.

Figure 1A:
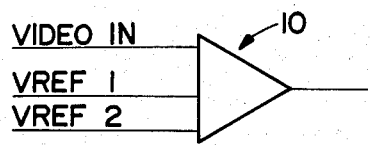
FIGS. 1a–1b are schematic representations of a window comparator used with the present invention.
Figure 2:
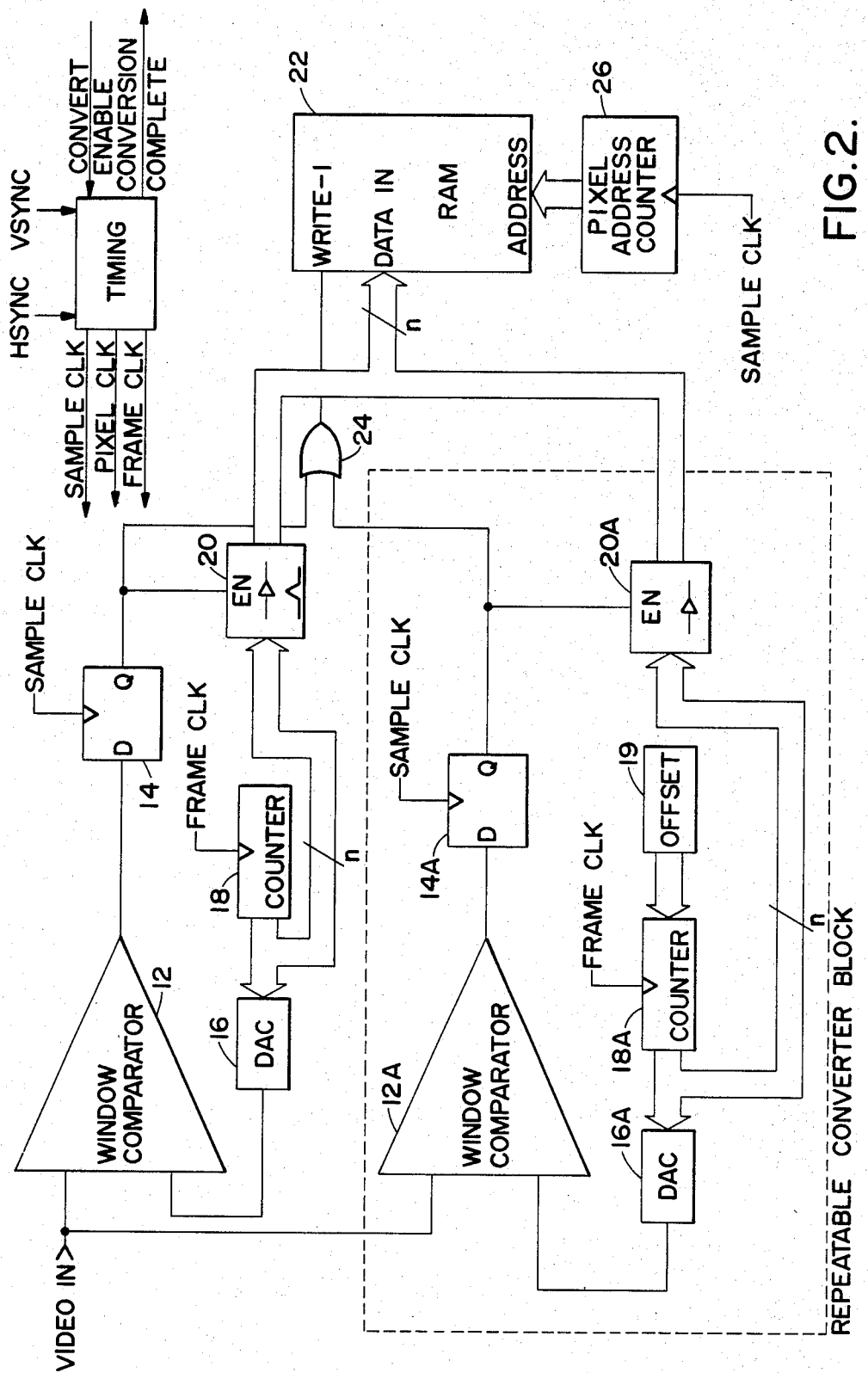
FIG. 2 represents one preferred embodiment of the raster scan frame digitizer of the present invention.

Before proceeding with a detailed description of the preferred embodiment of the invention, it is necessary to understand the functional operation of a window comparator, as shown in FIG. 2. Referring to FIG. 1a, a schematic representation of a typical window comparator 10 is illustrated. Note that there are three input terminals to the window comparator. One input terminal has applied thereto a first reference voltage VREF1. The second input terminal has applied thereto a second reference voltage VREF2. The third input terminal has applied thereto the video input signal. When the amplitude of the video input signal is greater than VREF1 but less than VREF2, an output signal is generated from the window comparator. However, if the amplitude of the video input signal lies outside the range from VREF1 to VREF2, no output signal is generated from the window comparator.

Figure 1B:
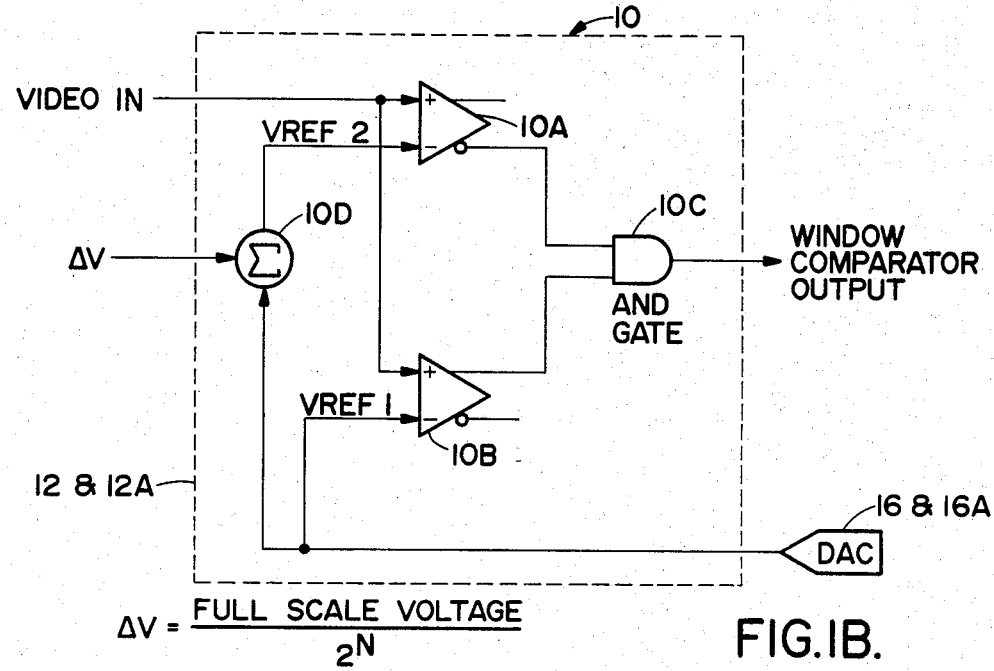

Referring to FIG. 1b, further detail of the window comparator 10 of FIG. 1a is illustrated. The window comparator 10 comprises a first comparator 10A and a second comparator 10B. Each of the first and second comparators 10A and 10B have complementary outputs, such that when one output is high, the other output is low, and viceversa. The video input signal energizes the positive input terminal of both comparators. The negative output terminal of the first comparator 10A is connected to one input of an AND gate. The positive output terminal of the second comparator 10B is connected to another input of the AND gate. A D to A converter (16 and 16A of FIG. 2) generates an output signal which energizes the negative input terminal of the second comparator 10B. The output signal from the D to A converter also energizes one input terminal of a summer 10D. The other input terminal of the summer has a voltage $\Delta V$ applied thereto, where $\Delta V = $ (full scale voltage)/$2^n$, $2^n$ being the maximum amplitude of the video input signal, n being the number of bits comprising each pixel. The sum of $\Delta V$ and the output signal from the D to A converter is applied to the negative input terminal of the first comparator 10A. In operation, when the video-in signal is greater than V REF 1, an output is generated from the positive output terminal of the second comparator 10B. However, the video-in signal must also be less than V REF 2 in order that an output signal be generated from the negative output terminal of the first comparator 10A. When outputs are generated from the negative and positive output terminals of the first and second comparators 10A and 10B, respectively, two high inputs are applied to the AND gate, yielding a high output signal generated therefrom, representing the window comparator output. Consequently, when the video-in signal is greater than VREF1 but less than VREF2, the window comparator output is generated.

Figure 1C:
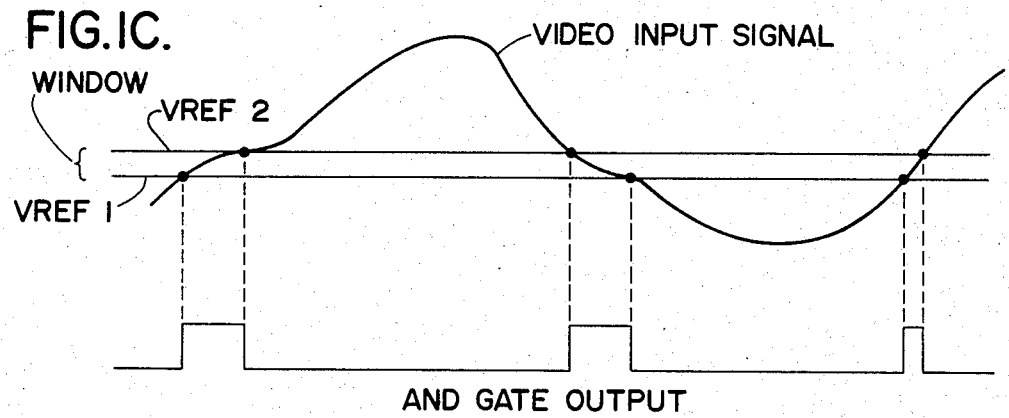
FIG. 1c is a timing waveform of the video input signal illustrated in conjunction with the window, the AND gate output, and the window comparator output of FIG. 1b.

In FIG. 1c, the video input signal waveform is illustrated along with the window, the width of the window being the difference between VREF1 and VREF2. The AND gate output pulses (the window comparator output) are shown as being generated when the video input signal amplitude lies in a range between VREF1 and VREF2.

Referring to FIG. 2, a preferred embodiment of the raster scan frame digitizer of the present invention is illustrated. The video input signal is applied to one input terminal of a window comparator 12. The output terminal of the window comparator 12 is connected to a D-type flip-flop 14. Sample clock pulses energize the D-type flip-flop 14. One sample clock pulse is generated each time a pixel on a line of a frame is encountered. The sample clock pulse ensures that the output signal from the D-type flip-flop 14 is high at the sample clock pulse's leading or rising edge. The other input terminal of window comparator 12 is connected to the output terminal of D to A converter 16. The input terminal of the D to A converter 16 is connected to the output terminal of an up counter 18. Frame clock pulses energize the up counter 18. In response to the clock pulse, the upcounter 18 begins its counting operation. One frame clock pulse is generated when the raster scan for each frame is initiated. The output terminal of the up counter 18 is also connected to the input terminal of a tristate buffer 20. The output terminal of the D-type flip-flop 14 is connected to an enable input terminal of the tri-state buffer 20. The tri-state buffer 20 may be thought of as a simple switch, wherein, when the output pulse from the D-type flip-flop is generated, the enable input terminal of the tri-state buffer 20 is energized, thereby closing the switch. The output terminal of the tri-state buffer 20 is connected to a data input terminal of a random access read/write memory 22.

The video input signal also energizes one input terminal of a second window comparator 12a. The output terminal of the second window comparator 12a is connected to the input terminal of a second D-type flip-flop 14a. The second D-type flip-flop 14a is also energized by the sample clock pulse as mentioned hereinbefore. In response to the energization of the second D-type flip-flop 14a by the sample clock pulse, the output pulse from the second D-type flip-flop 14a is high at the sample clock pulse's rising edge. The other input terminal of the second window comparator 12a is connected to the output terminal of a second D to A converter 16a. The input terminal of the second D to A converter 16a is connected to the output terminal of a down counter 18a. Since the down counter 18a must count down from a predetermined value, an offset circuit 19 is connected to the down counter 18a for loading the predetermined value into the counter. The offset circuit 19 loads the value $2^n$ into the down counter 18a as its predetermined value, where "n" is the number of bits representing each pixel, the value "$2^n$" defining the maximum amplitude of the video input signal. The down counter 18a is also energized by frame clock pulses, a frame clock pulse being generated when the raster scan for each frame is initiated. The output of the down counter 18a is also connected to the input of a second tri-state buffer 20a. The tri-state buffer 20a is also enabled by the output signal from the second D-type flip-flop 14a. When the output signal from the D-type flip-flop 14a enables the second tri-state buffer 20a, the buffer 20a generates an output signal representative of the count in the down counter 18A, the output signal energizing the data input terminal of the random access memory 22. The count in counter 18A is therefore stored in RAM 22. The outputs from the first and second D-type flip-flops 14 and 14a, respectively, are connected to the input terminals of an OR gate 24. The output terminal from the OR gate 24 is connected to the write-1 input terminal of the random access memory 22. The pixel address counter 26 is connected to the random access memory for addressing various locations within the random access memory 22. Sample clock pulses also energize the pixel address counter 26 for initiating the addressing of the RAM by the address counter 26 each time a pixel in the frame is encountered The functional operation of the FIG. 2 circuit embodiment can best be understood by reference to FIG. 3 of the drawings of the present application. Referring to FIG. 3, a video input signal for one frame is illustrated in conjunction with a multiple number of frames of the raster scan. In addition, the windows established by the first and second window comparators 12 and 12a, respectively are also illustrated. For frame 1, for example, a window established by the first window comparator 12 is near the V=0 mark. The window established by the second window comparator 12a is near the $V=2^n$ mark, where $2^n$ is set to be equal to the maximum amplitude of the video input signal. It is noted that the up-counter 18 counts up from the value "0" (zero). It is also noted that $2^n$ is a value which is loaded into the down counter 18a by the offset circuit 19, the down counter 18a counting down from the value $2^n$. In FIG. 3, reference is directed to frame 2. Note that the window established by the second window comparator 12a has moved down along the V axis, and the window established by the first window comparator has moved up along the V axis. Referring to frame n, the last frame, note that the windows established by the first and second window comparators 12 and 12a have merged at a point midway between the maximum and minimum values of the amplitude associated with the video input signal.

If a single window were used to digitize the video input signal, the window established by the first window comparator 12 would be used. In this particular case, the window must move from a point approximately equal to V=0 to a point approximately equal to $V=2^n$.

As can be seen from FIG. 3, since there are two windows used to digitize the video input signal, approximately half as much time is utilized in digitizing the video input signal than is utilized in digitizing the video input signal if only one window were utilized. Consequently, the raster scan frame digitizer shown in FIG. 2 of the drawings digitizes the video input signal much more quickly than would be the case if only one window comparator, counter, D to A converter, and D-type flip-flop were used.

Referring to FIG. 2, in operation, counter 18 is set to a value approximately equal to zero. This counter 18 begins its count when energized by a frame clock pulse. The frame clock pulse occurs once each frame of the raster scan, usually at the initiation of the scan of the frame. As the counter counts up in value, the D to A converter converts the digital input signal to an analog signal at its output terminal thereof. As the counter 18 increases its count, the window established by the first window comparator moves up along the V-axis, shown in FIG. 3. When the video input signal has an amplitude which lies within the window established by the window comparator 12, an output signal is developed therefrom. This output signal energizes the D-type flip-flop 14. A sample clock pulse energizes the D-type flip-flop 14 once each time a pixel, associated with a line in the frame, is encountered. The output signal from the D-type flip-flop 14 has a leading edge which corresponds to the leading edge of the sample clock. When the output signal from the D-type flip-flop 14 is generated, it energizes the enable input of the tri-state buffer 20. This closes the buffer 20 allowing the output signal from the counter 18 to energize the data input terminal of the random access memory 22. At the same time, the output signal from the D-type flip-flop passes through the OR gate 24 and energizes the write-1 terminal of the random access memory. When the write-1 terminal of the random access memory is energized, the RAM is enabled for permitting the data at the data input terminal to be written into memory. The data appearing at the data input terminal of the RAM is written into memory at a location selected by the pixel address counter 26, the address counter 26 selecting an address each time it is energized by the sample clock pulse. Consequently, the value in the counter 18 corresponds to the amplitude of the video input signal, the value in the counter being written into memory at the location designated by the pixel address counter. As the count in the counter 18 increases, the window established by the first window comparator 12 moves up along the V axis, as shown in FIG. 3 of the drawings.

At the same time, when the counter 18 is energized for counting up in value, the counter 18a is energized by the frame clock pulse for counting down in value. The counter is set at the value $2^n$ by the offset circuit 19, and begins its count downward in response to energization by the frame clock pulse. As the counter 18a counts down in value, the window established by the second window comparator 12a also moves down along the V-axis, as shown in FIG. 3. As before, the output of the counter 18a is converted into an analog value by the D to A converter 16a. If the video input signal falls within the window defined by the analog equivalent of the counter value, in accordance with the output of the D to A converter 16a, an output signal is generated from the window comparator 12a and energizes the input terminal of the D-type flip-flop 14a. As before, the sample clock pulse energizes the D-type flip-flop in order that an output signal may be generated from the flip-flop 14a, the output signal from the D-type flip-flop 14a having a rising edge which corresponds to the rising edge of the sample clock. The output signal from the D-type flip-flop 14a energizes the enable terminal of the second tri-state buffer 20a. The count in the counter 18a (representative of the amplitude of the video input signal) also energizes the tri-state buffer 20a. When the enable terminal of the tri-state buffer 20a is energized, the count in the down counter 18a passes therethrough for energizing the data input terminal of the random access memory 22. Since the output from the D-type flip-flop 14a is high, the write-1 terminal of the RAM is also energized, enabling the RAM to write the count, present at the data input terminal, into memory, in an address selected by the pixel address counter 26 in response to the sample clock pulse.

Consequently, it can be seen from FIG. 2 that, as the counter 18 counts up in value, the window established by the first window comparator 12 moves up along the "V" axis, as shown in FIG. 3. Simultaneously with this, as the down counter 18a counts down in value, the window established by the second window comparator 12a moves down along the V axis. As shown in FIG. 3, the count in counters 18 and 18a represent the amplitude of the video signal. When the outputs of the counters 18 and 18a are stored in memory, the values written therein represent the amplitude of the video signal. Consequently, the entire frame has been digitized and written into memory. However, the speed at which the frame has been digitized has been doubled since two windows are used to sample and stored into memory the amplitudes associated with the video input signal.

It would be obvious to one of ordinary skill in the art that three or more additional window comparators, three or more counters, three or more D-A converters, three or more flip-flops, and three or more tri-state buffers, connected together in the same manner as shown in FIG. 2, could be utilized to still further increase the speed at which the video input signal has been digitized and stored into memory. For example, as shown in FIG. 4, the video information associated with frame 1 is illustrated in conjunction with three windows, the first window being associated with a first window comparator, the second window being associated with a second window comparator, and the third window being associated with a third window comparator.

The present invention is directed to increasing the speed at which the video input signal is digitized and stored into a memory. This is accomplished by using two or more converter blocks, connected in parallel with one another, each block including a window comparator, a D-type flip-flop, a D to A converter, a counter (either an up-counter or a down-counter, depending on the number of windows), and a tri-state buffer, all of which are connected in the configuration shown in FIG. 2. As the number of converter blocks increase, the video input signal is more rapidly digitized and stored in memory. The total time it takes to digitize a frame is equal to the following:

| RAM Write Cycle Time | 1 | $2^n$ |
|---|---|---|
| Active Horz. Line Time | No. Pixels per line | Frame Rate | 2 (No. Converter Block Pairs) |

For a typical system, the RAM Write Cycle Time is approximately equal to 400 ns; the Active Horizontal Line Time is approximately equal to 56 μs; the number of pixels per line is approximately equal to 521; the Frame Rate is approximately equal to 30 Hz; n is equal to 4 bits. Using this information, the following total time can be calculated for digitizing a frame of image data:

$$\frac{400 \text{ ns}}{56 \text{ } \mu s/512} \cdot \frac{1}{30 \text{ Hz}} \cdot \frac{2^4}{2} \cdot \frac{\phantom{1}}{1} = 1 \text{ second}$$

Figure 5A:
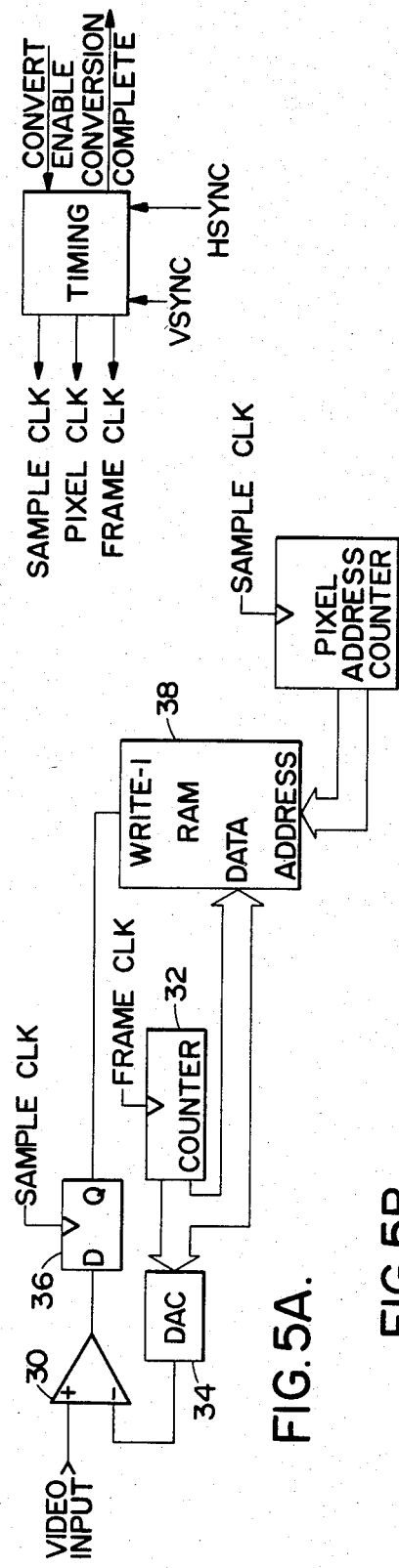
FIGS. 5a–5b illustrate and describe an alternative embodiment of present invention.

Referring to FIG. 5a, an alternative embodiment of invention is illustrated. In FIG. 5a, a window comparator is not utilized. In lieu of the window comparator, a comparator 30 is used to compare the amplitude of the video input signal, for each pixel, with a fixed value, that is, the analog version of the count contained in an up-counter 32. In FIG. 5a, the video input signal is scanned a multiple number of times corresponding to a multiple number of frames of the video input signal. For example, with respect to frame 1, the up-counter is incremented by one, and is converted to an analog value via the D to A converter 34. The magnitude of the video input signal for each pixel of each frame is compared with the analog value via comparator 30, and an output signal is generated therefrom when said magnitude is not equal to said analog value.

When a sample clock pulse (one per pixel) energizes D-type flip-flop 36, the output signal from comparator 30 enables a RAM memory 38, and the count of the up-counter 32 is written into the RAM memory 38, in a location corresponding to the respective pixel in the frame. When the scan of the image in frame 2 is initiated, the count in the up-counter 32 is incremented by "one". At this point, the above-described operation repeats once again. The count of the up-counter, written into a location of the RAM memory 38 during frame 1, is over-written by another count of the up-counter 32, in said location. In fact, multiple write-cycles are implemented wherein the count of the up-counter 32, for each pixel, is written into the RAM memory 38 a multiple number of times corresponding to the number of frames. The number of frames, in turn, is directly related to the maximum amplitude of the video input signal. The count stored in RAM 38, for each pixel, is gradually built-up until the analog version of the count of the counter 32, appearing as one input to comparator, equals the amplitude of the video input signal appearing as the other input to comparator 30. When this equality is established, further writing into the RAM memory 38, for said each pixel, is terminated. The end result is a complete digital representation of the CRT image stored in RAM 38.

Figure 5B:
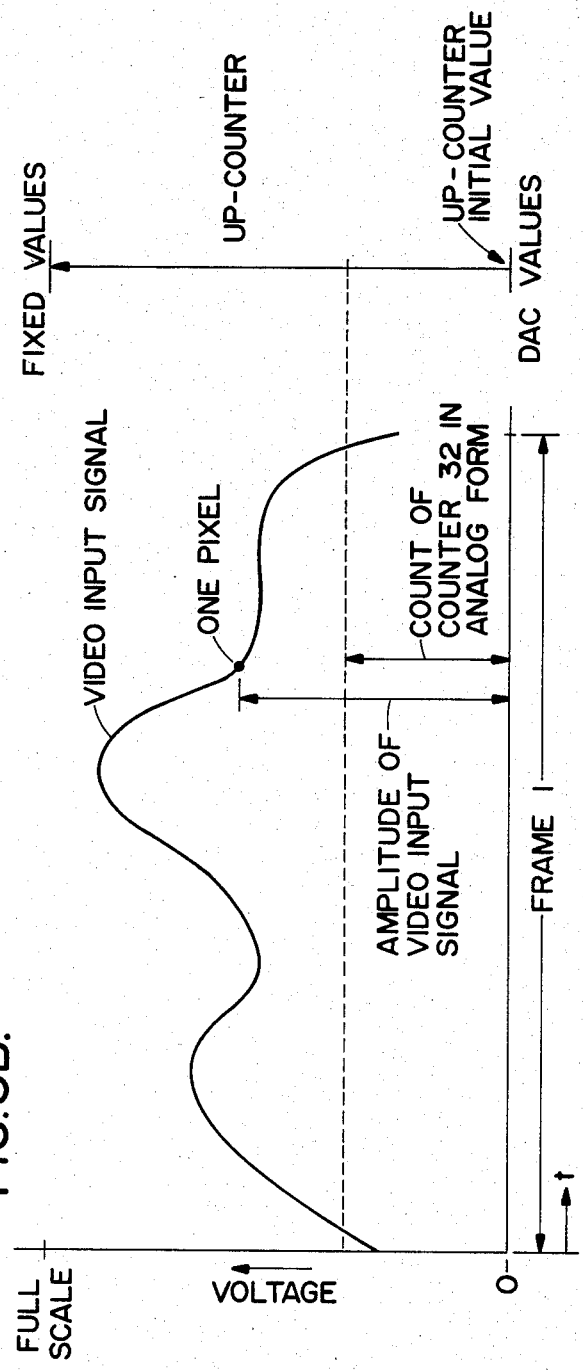

In FIG. 5b, a video input signal is illustrated for a frame 1. The count of the counter 32, in analog form, is illustrated in conjunction with the magnitude of the video input signal for one pixel. As can be seen in FIG. 5b, when the count of the counter 32, in analog form, becomes approximately equal to the amplitude of the video input signal, for said one pixel, the output signal from the comparator 30 becomes approximately equal to zero, and further writing into RAM 38 for said one pixel, is terminated.

Figure 6A:
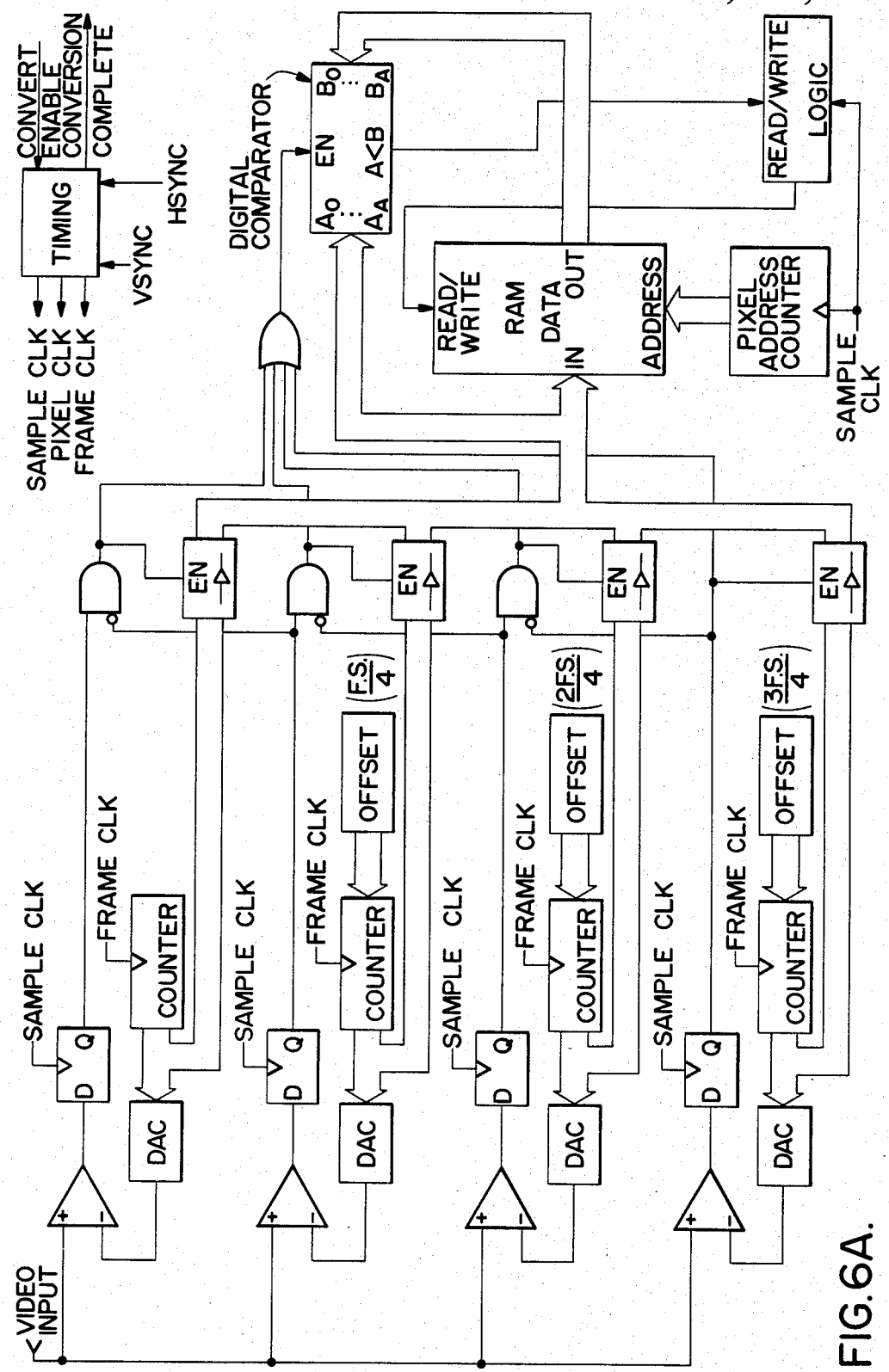
FIGS. 6a–6c illustrate and describe still another alternative embodiment of present invention.

In FIG. 6a, another alternative embodiment of invention is illustrated. This embodiment represents an expanded version of the embodiment of FIG. 5a in that four of the circuits, as shown in FIG. 5a, are illustrated as being connected in parallel fashion. Four separate counts of four different counters are compared with the amplitude of the video input signal. As a result, the time required to digitize the video input signal and store said signal in the RAM memory, is decreased. However, this embodiment requires that digital data be written into as well as read from the RAM memory.

Figure 6B:
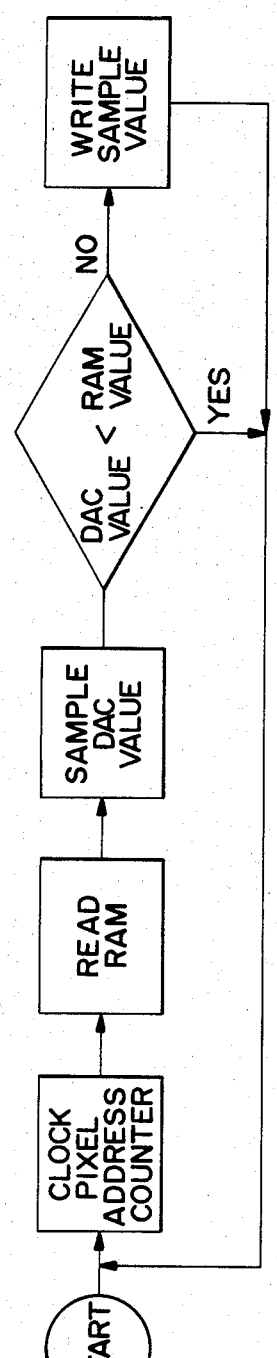

FIG. 6b is a flow chart depicting the functional operation of the embodiment of invention shown in FIG. 6a.

Figure 6C:
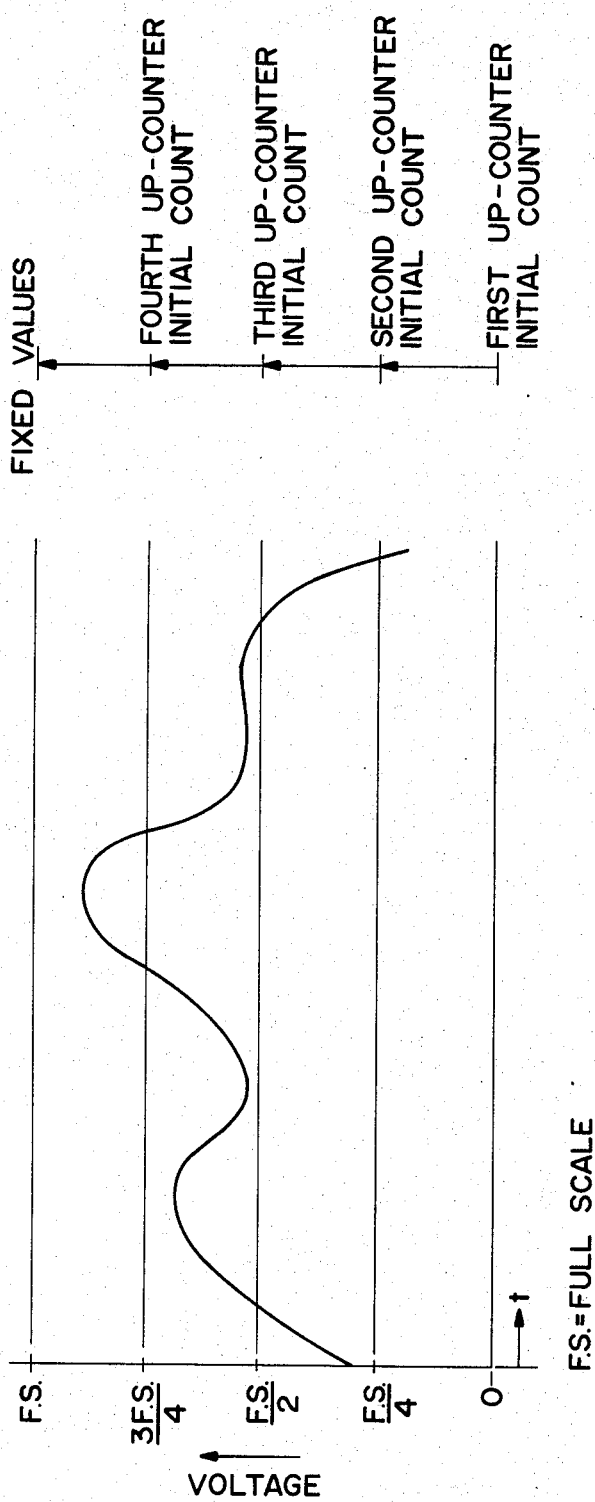

FIG. 6c illustrates a video input signal. The signal is digitized in generally the same manner as in FIG. 5b, except that four separate "fixed values", i.e., four upcounters, are compared with the amplitude of the video input signal. The initial counts of each of the four upcounters are shown in this figure.

As a result, the rate at which the video input signal is digitized is increased by an approximate factor of four.

Figure 7A:
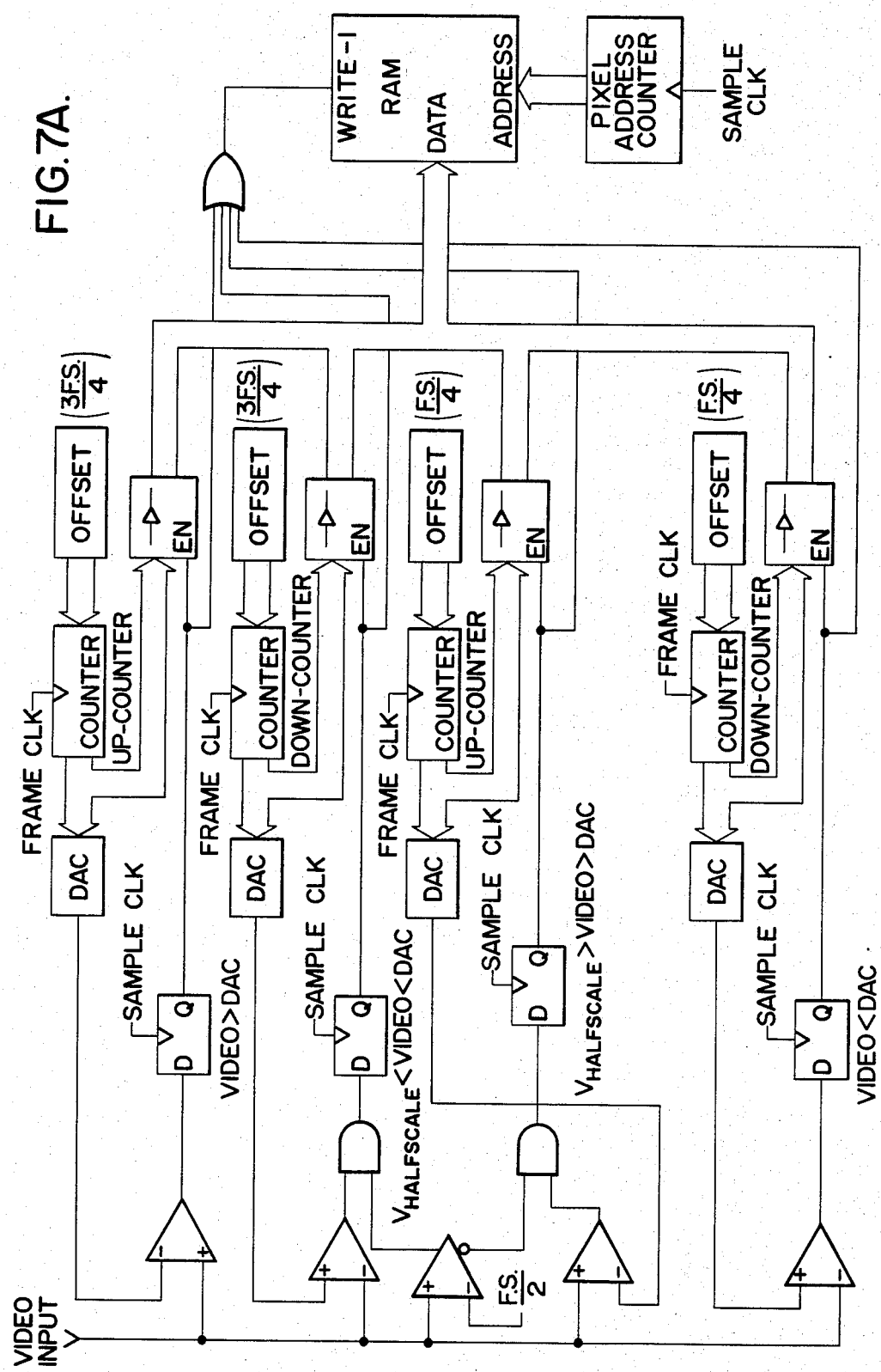
FIGS. 7a–7b illustrate and describe still a further alternative embodiment of present invention.

In FIG. 7a, still another embodiment of the present invention is illustrated. As can be seen in FIG. 7a, a window comparator is not utilized. In addition, digital data is not read from the RAM. Rather, digital data is written into the RAM. However, up-counters and down-counters are utilized to implement the digitization scheme of this embodiment of invention.

Figure 7B:
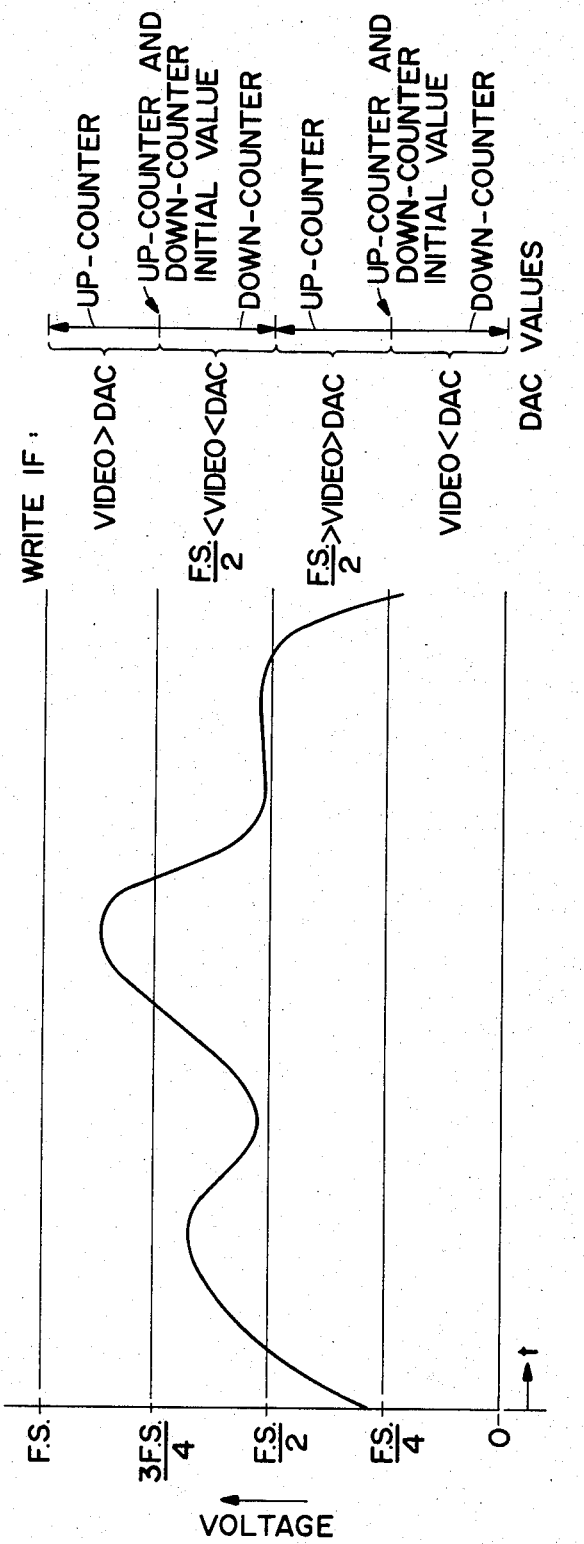

In FIG. 7b, the video input signal is again illustrated. This figure illustrates the manner by which the up-counters and the down-counters digitize the video input signal.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

We claim as our invention:

1. An apparatus for digitizing a stationary video input signal and storing the digitized values in a memory, comprising:
   first means responsive to said video input signal for creating a first window region disposed along the time axis of said video input signal and for moving said first window region along the amplitude axis of said video input signal in a first direction, said first means sampling the amplitude of the video signal within said first window region as said first window region is moved along the amplitude axis and storing the sampled amplitude in said memory; and
   second means responsive to said video input signal for creating a second window region disposed along the time axis of said video input signal and for moving said second window region along the amplitude axis of said video input signal in a second direction opposite to said first direction, the region encompassed by the moving second window not including the region encompassed by the moving first window, said second means sampling the amplitude of the video signal within said second window region as said second window region is moved along the amplitude axis and storing the sampled amplitude in said memory.

2. A method of digitizing a video input signal comprising the steps of:
   sampling said video input signal at a plurality of points along the time axis of said signal;
   comparing the sample of said video input signal with plural references;
   storing a value corresponding to said sample in a storage means when said sample approximately equals one of said references;
   changing said references by increasing at least one reference and decreasing at least another reference thereby creating new references; and
   repeating the sampling step, the comparing step, and the storing step using said new references, the sampling step, the comparing step, the storing step, the changing step, and the repeating step being repeated until the values corresponding to the samples of said video input signal associated with each of said plurality of points along said time axis are stored in said storage means.

3. An apparatus for digitizing a video input signal, comprising:
   means for establishing plural reference values and for increasing at least one such reference value while decreasing at least another such reference value;
   plural comparison means responsive to said video input signal for comparing said reference values with the amplitude of said video input signal at a plurality of points along the time axis of said video input signal for developing respective output signals when the amplitude of said video input signal compares with one of said reference values; and
   storage means for storing said values when a comparison is achieved as indicated by a said output signal.

4. An apparatus for digitizing an image, comprising:
   plural counting means for establishing respective values, including at least one up-counter and at least one down-counter;
   plural comparators responsive to a video input signal representative of said image for comparing values in said counting means with the amplitude of said video input signal at a plurality of points along the time axis of said video input signal for developing respective output signals when the amplitude of said video input signal exceeds one of said values, said plural comparators corresponding, respectively, to the total number of up and down counters;
   wherein the counts in the respective counters are counted up and down to change said values and the comparators repeat their comparisons with said values to develop said output signals; and storage means responsive to said values and said output signals for storing said values therein when energized by output signals from said comparators.

5. An apparatus for digitizing a video input signal waveform upon successive frame occurrences thereof, each frame occurrence corresponding to a desired set of amplitude axis values which are a function of the same number of time axis values, said apparatus comprising:

means for establishing substantially simultaneously at least a pair of successive amplitude axis references, one increasing and one decreasing, for selected frame occurrences of the video input signal, including the presentation of reference values over the amplitude axis range of said video input signal;

comparing means responsive to said reference values and to said video input signal for comparing said values with the amplitude of said video input signal at a plurality of points along the time axis of said video input signal during respective occurrences thereof for developing an output when the amplitude of said video input signal compares with one of said reference values; and storage means for storing said reference values when a comparison is achieved as indicated by said output whereby said storage means stores a representation of said video input signal waveform after a plurality of occurrences of said video input signal corresponding to the presentation of reference values over said range.

6. The apparatus according to claim 5 further including gating means for enabling said comparing means to produce no more than a single output, in order of amplitude value, for a single point along the time axis of the video input signal;

said storage means being responsive to said reference value corresponding to said single output to prevent simultaneous writing of multiple reference values into said storage means.

* * * * *